US011955108B2

(12) United States Patent
Hsu et al.

(10) Patent No.: US 11,955,108 B2
(45) Date of Patent: Apr. 9, 2024

(54) ADAPTIVE ACTIVE NOISE CANCELLATION APPARATUS AND AUDIO PLAYBACK SYSTEM USING THE SAME

(71) Applicant: Airoha Technology Corp., Hsinchu (TW)

(72) Inventors: Chao-Ling Hsu, Hsinchu (TW); Li-Wen Chi, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 109 days.

(21) Appl. No.: 17/689,436

(22) Filed: Mar. 8, 2022

(65) Prior Publication Data

US 2023/0054927 A1 Feb. 23, 2023

(30) Foreign Application Priority Data

Aug. 17, 2021 (CN) ........................ 202110944442.1

(51) Int. Cl.
*G10K 11/178* (2006.01)
*H04R 1/10* (2006.01)

(52) U.S. Cl.
CPC .. *G10K 11/17881* (2018.01); *G10K 11/17854* (2018.01); *H04R 1/1083* (2013.01); *G10K 2210/1081* (2013.01)

(58) Field of Classification Search
CPC ....... G10K 11/17881; G10K 11/17854; G10K 2210/1081; G10K 11/17823; G10K 11/17825; G10K 2210/3023; G10K 2210/30231; G10K 2210/30232; H04R 1/1083; H04R 5/033; H04R 2460/01
USPC ........................................................ 381/71.6
See application file for complete search history.

(56) References Cited

U.S. PATENT DOCUMENTS

| | | | | |
|---|---|---|---|---|
| 5,396,561 | A * | 3/1995 | Popovich ......... | G10K 11/17819 381/71.5 |
| 10,117,019 | B2 | 10/2018 | Elko et al. | |
| 10,225,674 | B2 | 3/2019 | Olsson et al. | |
| 10,229,698 | B1 | 3/2019 | Chhetri | |
| 10,522,167 | B1 | 12/2019 | Ayrapetian et al. | |

(Continued)

FOREIGN PATENT DOCUMENTS

| | | | |
|---|---|---|---|
| CN | 1753084 | A | 3/2006 |
| CN | 103002170 | A | 3/2013 |

(Continued)

OTHER PUBLICATIONS

Kuo et al., "Active Noise Control: A Tutorial Review", Proceedings of the IEEE, vol. 87, No. 6, Jun. 1999, pp. 943-973.

*Primary Examiner* — Carolyn R Edwards
*Assistant Examiner* — Friedrich Fahnert
(74) *Attorney, Agent, or Firm* — Birch, Stewart, Kolasch & Birch, LLP

(57) ABSTRACT

The invention relates to an adaptive active noise cancellation apparatus and an audio playback system using the same. The adaptive active noise cancellation apparatus shapes an error signal and a noise signal according to a shape of an ideal noise. After that, the shaped noise signal and the shaped error signal are sent into a parameter adjusting unit to perform an adaptive parameter adjustment. Thus, the adaptive noise filter unit is not only can adaptively suppress noise and minimize the error signal, but also can suppress specific frequencies that are sensitive to the human ear.

28 Claims, 12 Drawing Sheets

(56) References Cited

U.S. PATENT DOCUMENTS

| | | | | |
|---|---|---|---|---|
| 2006/0222184 | A1 | 10/2006 | Buck et al. | |
| 2012/0114142 | A1 | 5/2012 | Nishigori et al. | |
| 2012/0310637 | A1 | 12/2012 | Vitte et al. | |
| 2013/0287218 | A1* | 10/2013 | Alderson | G10K 11/17833<br>381/71.6 |
| 2014/0086425 | A1* | 3/2014 | Jensen | G10K 11/17825<br>381/71.11 |
| 2020/0204916 | A1* | 6/2020 | Milani | G10K 11/17854 |

FOREIGN PATENT DOCUMENTS

| | | | |
|---|---|---|---|
| CN | 106952653 | A | 7/2017 |
| JP | 5365380 | B2 | 12/2013 |
| TW | 201837900 | A | 10/2018 |
| WO | WO 2018/165550 | A1 | 9/2018 |

* cited by examiner

ADAPTIVE ACTIVE NOISE CANCELLATION APPARATUS AND AUDIO PLAYBACK SYSTEM USING THE SAME

CROSS-REFERENCE TO RELATED APPLICATIONS

This application claims the benefit of priority to Patent Application No. 202110944442.1, filed in China on Aug. 17, 2021; the entirety of which is incorporated herein by reference for all purposes.

BACKGROUND

The disclosure generally relates to a technology of noise cancellation and, more particularly, to an adaptive active noise cancellation apparatus and an audio playback system using the same.

General noise reduction techniques for headphones include passive noise cancellation (PNC) and active noise cancellation (ANC). The passive noise cancellation mainly isolate noise as much as possible through headphone sound-insulation materials or special structures, which generally are in-ear headphones or over-ear headphones. Wearing these two-types headphones for a long period of time cause ear pain, and excessive sound pressure may even cause users' hearing loss. The active noise cancellation means that a special noise cancellation circuit is set in headphones. Generally, an audio receiver (such as a miniature microphone) and an anti-noise output chip are used to receive and analyze frequency of external noise and generate an anti-noise sound in inverted phase. By the destructive interference, the external noise would be canceled.

Further, implementation of noise reduction of ANC is divided into factory preset ANC filters and adaptive ANC filters. The adaptive ANC filter basically generates different noise cancellation transfer functions according to environmental noise. With time of the ANC filter operation, the error between the environmental noise and the generated anti-noise sound is gradually compared and converged, and the environmental noise is canceled thereby. In fact, for different environmental noises, the conventional ANC filter exhibits different capabilities of noise cancellation, such that the conventional ANC filter is relatively unreliable. How to reduce the impact of environmental noise on the capability of noise cancellation has become a crucial issue in this field.

SUMMARY

In view of this, how to reduce or eliminate the deficiencies in the above-mentioned prior art field and how to suppress noise in a manner that conforms to environmental noise by adaptive active noise elimination filtering technology are the issues to be solved.

The present invention provides an audio playback system for outputting an anti-phase noise audio signal according to an anti-phase noise signal, wherein the audio playback system includes an error microphone, and an adaptive active noise cancellation apparatus. The error microphone receives an environmental noise and the anti-phase noise audio signal, to generate an error signal. The adaptive active noise cancellation apparatus includes an automatic noise shaping circuit, an adaptive active noise filtering unit, a first transmission channel simulation unit and a coefficient adjustment unit. The automatic noise shaping circuit receives the error signal, shaping an interference signal to a shaped interference signal and the error signal to a shaped error signal according to a preset noise shape and outputting the shaped interference signal and the shaped error signal. The adaptive active noise filtering unit receives the interference signal, outputting the anti-phase noise signal for generating the anti-phase noise audio signal. The first transmission channel simulation unit receives the shaped interference signal, for generating a simulated shaped interference signal according to a channel transfer function. The coefficient adjustment unit receives the simulated shaped interference signal and the shaped error signal, adjusting a filter parameter of the adaptive active noise filtering unit by an adaptive algorithm according to the simulated shaped interference signal and the shaped error signal.

In accordance with a preferred embodiment of the present invention, when the audio playback system is a feedback active noise cancellation headphone, the interference signal is the restored environmental noise signal. In the other preferred embodiment of the present invention, when the audio playback system is a feedforward active noise cancellation headphone, the audio playback system further includes an external noise receiving microphone for receiving an external audio noise to convert the external audio noise to the interference signal.

The spirit of the present invention is to shape the received error signal and the received interference signal according to an ideal noise shape. Afterward, the shaped interference signal and the shaped error signal is transmitted to the coefficient adjustment unit to perform adaptive parameter algorithm, such that the adaptive active noise filtering unit is not only can affectively suppress the external noise and the noise in the ear canal to minimize the error signal, but also can suppress specific frequencies to which the human ear is sensitive.

The other advantages of the present invention will be explained in more detail in conjunction with the following description and drawings.

Both the foregoing general description and the following detailed description are examples and explanatory only, and are not restrictive of the invention as claimed.

BRIEF DESCRIPTION OF THE DRAWINGS

FIG. 1 illustrates a frequency response diagram depicting a magnitude of an ideal noise and a magnitude of a suppressed noise when the adaptive noise cancellation function is turned on.

FIG. 2 illustrates a frequency response diagram depicting a magnitude of a general environmental noise and a magnitude of a suppressed general environmental noise when the adaptive noise cancellation function is turned on.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
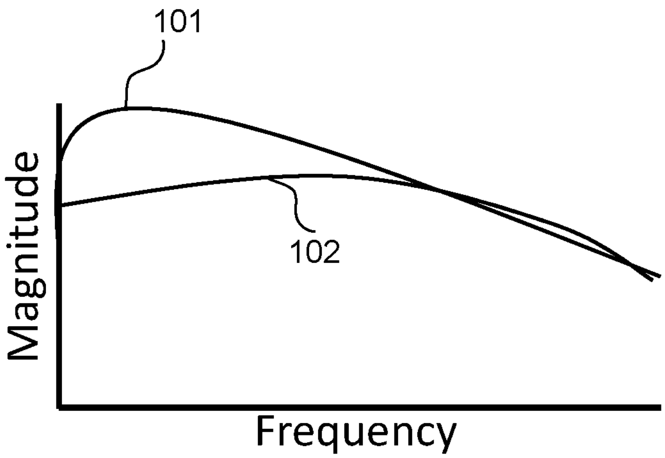

FIG. 1 illustrates a frequency response diagram depicting a magnitude of an ideal noise and a magnitude of a suppressed noise when the adaptive noise cancellation function is turned on. Referring to FIG. 1, the horizontal axis is frequency, and the vertical axis is amplitude. When the noise has an ideal noise shape as indicated by 101 in FIG. 1, the noise cancellation result will be similar to that indicated by 102. The noise suppression is quite good. However, general environmental noise is not quite similar to ideal noise.

Figure 2:
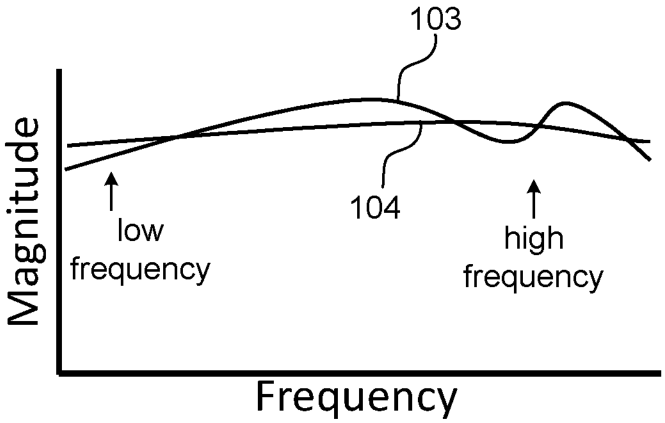

FIG. 2 illustrates a frequency response diagram depicting a magnitude of general environmental noise and a magnitude of suppressed general environmental noise when the adaptive noise cancellation function is turned on. Referring to FIG. 2, a designator 103 indicates the general environmental noise, and a designator 104 indicates the noise cancellation result for the general environmental noise 103. The ANC filter when adapting by means of adaptive algorithm is intended to suppress the high-magnitude component of the noise, the component with the relatively high magnitude. Therefore, in this exemplary embodiment, a portion of noise in the high-frequency band is suppressed. However, the low-frequency noise is increased rather than suppressed. Although in the frequency response diagram, the adaptive active noise cancellation filtering technology does suppress the noise, unfortunately, it is much more sensitive to low-frequency noise than high-frequency noise for normal human hearing. From the noise cancellation result 104 in FIG. 2, it can be observed that the noise is indeed suppressed; however, for the end user, a louder noise may be experienced and it may make the end user feel more uncomfortable.

Figure 3:
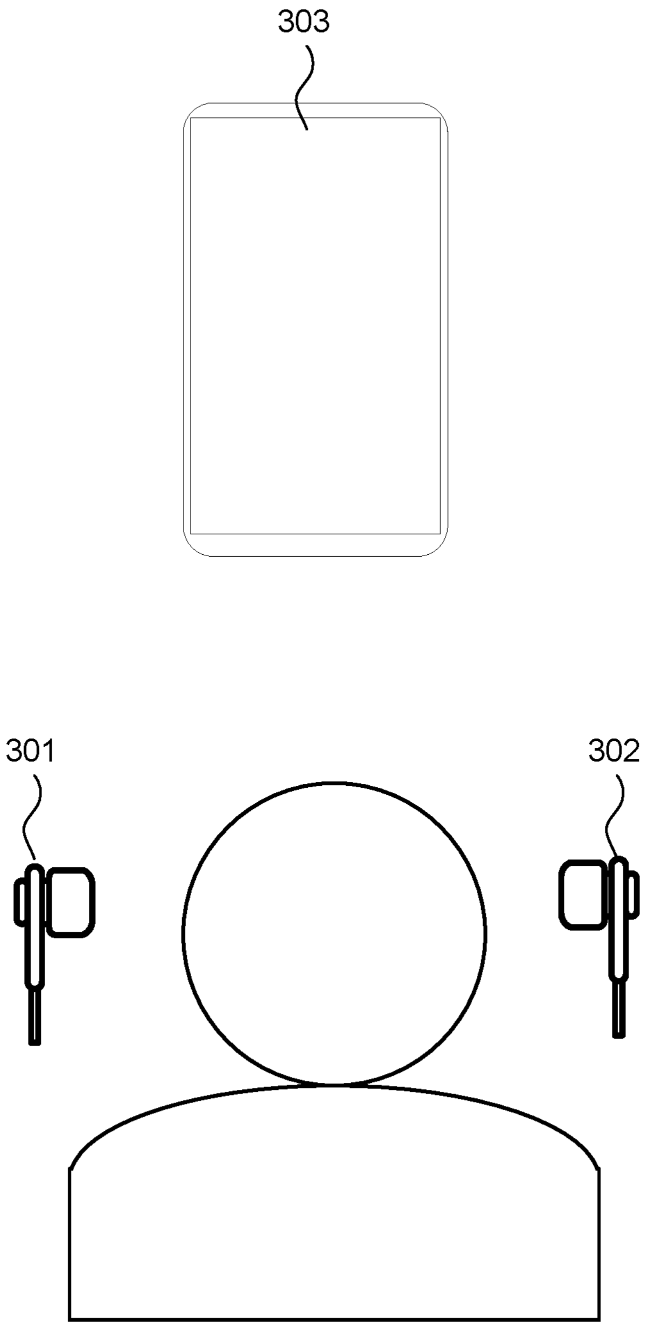
FIG. 3 illustrates a schematic diagram depicting an adaptive active noise cancellation apparatus according to a preferred embodiment of the present invention.

FIG. 3 illustrates a schematic diagram depicting an adaptive active noise cancellation apparatus according to a preferred embodiment of the present invention. Referring to FIG. 3, in this embodiment, wireless earbuds are taken as an example. The wireless earbud is a pair of devices with wireless communication capabilities, including a left wireless earbud 301 and a right wireless earbud 302. There is no physical connection between the left wireless earbud 301 and the right wireless earbud 302.

A wireless communication protocol, such as A2DP (advanced audio distribution profile) Bluetooth package, can be used to transmit the user's speech signal or music package between the mobile device 303 and the left wireless earbud 301 and between the mobile device 303 and the right wireless earbud 302.

In other embodiments, Wi-Fi Direct or other P2P (Peer-to-peer) protocols can also be adopted between the mobile device 303 and the left wireless earbud 301 and between the mobile device 303 and the right wireless earbud 302. The present invention is not limited thereto. In the abovementioned embodiment, although wireless earbuds are taken as an example of the ANC audio playback system, people having ordinary skill in the art should know that the ANC audio playback system may also be wired headphones (earbuds or headset) as preferred embodiments, and the present invention is not limited thereto.

Figure 4:
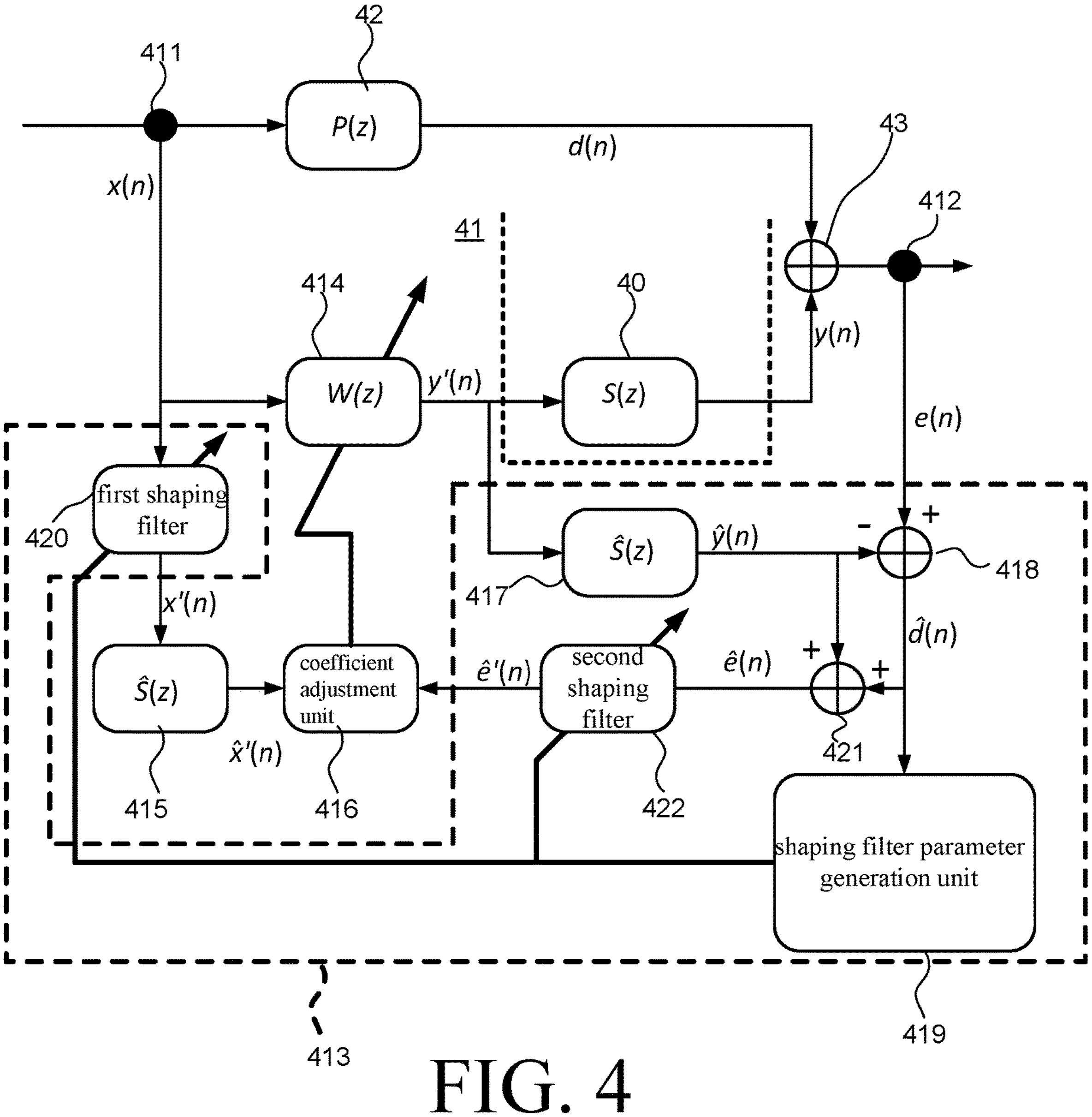
FIG. 4 illustrates a circuit block diagram depicting an audio playback system according to a preferred embodiment of the present invention.

FIG. 4 illustrates a circuit block diagram depicting an audio playback system according to a preferred embodiment of the present invention. Referring to FIG. 4, the audio playback system includes an adaptive active noise cancellation apparatus 41, an external noise receiving microphone 411 and an error microphone 412. The adaptive active noise cancellation apparatus 41 includes an automatic noise shaping circuit 413, an adaptive active noise filtering unit 414, a first transmission channel simulation unit 415 and a coefficient adjustment unit 416. In this embodiment, the feedforward ANC earbuds are taken as an example.

It is noted that the audio playback system involves both the acoustic domain and the electrical domain. For example, the symbols d(n) and y(n) indicated in FIG. 4 represent acoustic signals in the acoustic domain, and the rest of symbols in FIG. 4 represent electrical signals in the electrical domain. However, in order to simplify the interpretation, in the following description, the electrical and acoustic signals are no longer distinguished if it is not necessary.

The audio channel response schematic block 42 can be seen as a primary path, for representing a transmission path from a reference microphone (i.e., the external noise receiving microphone 411 in the embodiment in FIG. 4) to the error microphone 412, and the transfer function P(z) represents the simulation (analysis) result for an acoustic signal passing through the transmission path. Ideally, the transfer function P(z) is evaluated based on the acoustic signal received by the reference microphone 411 and the acoustic signal received by the error microphone 412. However, in practice, it is impossible to obtain the acoustic signal, so the related electrical signal is adopted instead of the acoustic signal for analysis to obtain the transfer function P(z). In some possible implementations, the adaptive active noise cancellation apparatus 41 is disabled and the transfer function P(z) is evaluated based on the signal x(n) obtained via the reference microphone 411 and based on the signal e(n) obtained via the error microphone 412. Since the adaptive active noise cancellation apparatus 41 is disabled and there is no signal y(n) to be outputted, the signal e(n) is substantially the same as the signal d(n).

The transmission channel 40 can be referred to as a secondary path, for representing a transmission path from the adaptive active noise filtering unit 414 to the error microphone 412, thereby the conversion of the electrical signal, which is output by the adaptive active noise filtering unit 414 and passes through the transmission path, is analyzed, wherein the channel transfer function S(z) represents the simulation result of the conversion. In some possible implementations, the external noise source is removed, and the transfer function S(z) is evaluated based on the signal y'(n) output by the adaptive active noise filtering unit 414 and the signal e(n) obtained through the error microphone 412. Due to the absence of external noise sources, the signal d(n) doesn't exist and the signal e(n) is substantially the same as the signal y(n).

The external noise receiving microphone 411 receives an external audio noise (e.g., environmental noise), and converts the external audio noise into a digital interference signal x(n). The adaptive active noise filtering unit 414 receives the interference signal x(n), and outputs an anti-phase noise signal y'(n) based on the interference signal x(n).

The error microphone 412 receives the environmental noise d(n) and an anti-phase noise audio signal y(n) in the ear canal, and converts them to a digital error signal e(n) accordingly, wherein the external audio noise is converted into the environmental noise d(n) through the audio channel response schematic block 42. Since both environmental noise d(n) and anti-phase noise audio signal y(n) are analog acoustic signals, in the acoustic domain, the above environmental noise d(n) and the anti-phase noise audio signal y(n) would interfere with each other in the ear canal. For the convenience of description, an adder symbol 43 is especially illustrated in the drawings. People having ordinary skill in the art should know that the adder symbol 43 is not a physical element, and is only used to represent the interference phenomenon of two analog acoustic signals.

The adaptive active noise filtering unit 414 is used to generate an anti-phase noise signal y'(n) based on the interference signal x(n) and the error signal e(n), and the anti-phase noise signal y'(n) is converted into the anti-phase noise audio signal y(n) through the transmission channel 40. In another embodiment, the adaptive active noise filtering unit 414 includes a finite impulse response (FIR) filter. In detail, in the embodiment of the present invention, the adaptive active noise filtering unit 414 is an adaptive filter that adjusts coefficients through adaptive algorithm of iterative method. In an ideal situation, after the audio signals interfere with each other, the anti-phase noise audio signal y(n) can almost entirely eliminate the environmental noise d(n) such that the error signal e(n) would approach to zero. However, in real noise eliminating process, due to different filter designs and different filter coefficient algorithms, it is difficult to eliminate noise in a specific frequency band, especially the low-frequency noise, to which the human ears are more sensitive. Further, in the real environment, due to the changing of external audio noise, the actual noise cancellation result would be also changed accordingly, such that the noise heard by user would be sometimes louder and sometimes lower.

Accordingly, ideally, a possible way is to shape the external audio noise to reduce the degree of variation in environmental noise, so that a noise reduction filter can generate an effective anti-phase noise signal based on shaped external audio noise, which has the lower variation than the unshaped external audio noise, provided by the microphone. However, in practice, it is difficult to shape the external audio noise propagating in the air. An alternative method is to shape the interference signal x(n) generated by the external noise receiving microphone 411 and the error signal e(n) generated by the error microphone 412.

In addition, since the external audio noise may change at any time, it is necessary to dynamically adjust shaping means. Since the environmental noise d(n) is derived from the external audio noise, the degree of variation in the external audio noise can be identified by analyzing the environmental noise d(n).

The automatic noise shaping circuit 413 in the embodiment of the present invention is designed based on the above reasons, such that it can effectively suppress the environmental noise d(n), and can suppress the specific frequencies (generally low frequencies) to which the human ears are more sensitive. The detailed description is as follows.

In this embodiment, the automatic noise shaping circuit 413 includes a second transmission channel simulation unit 417, a first adder circuit 418, a shaping filter parameter generation unit 419, a first shaping filter 420, a second adder circuit 421 and a second shaping filter 422. In another preferred embodiment, the automatic noise shaping circuit 413 can be implemented by a digital signal processor (DSP).

As mentioned above, the automatic noise shaping circuit 413 is used to shape the interference signal x(n) generated by the external noise receiving microphone 411 and the error signal e(n) generated by the error microphone 412, and provide the shaped signals to the coefficient adjustment unit 416. As such, input signals received by the coefficient adjustment unit 416 can maintain the characteristic of the current environmental noise, and the frequency distribution of the input signal is modified as well. Therefore, the anti-phase noise signal y'(n) generated by the adaptive active noise filtering unit 414 can effectively suppress the environmental noise d(n), and can also suppress specific frequencies (generally low frequencies) to which the human ears are more sensitive.

Therefore, in this embodiment, the first shaping filter 420 is used to shape the interference signal x(n) to generate a shaped interference signal x'(n), and the second shaping filter 422 is used to shape a restored error signal e(n), which can be regarded as the error signal e(n), to generate a shaped error signal ê'(n). The first shaping filter 420 and the second shaping filter 422 are, for example, digital filters (or equalizers), and shaping filter parameters for each of the two shaping filters 420 and 422 are generated by a shaping filter parameter generation unit 419, wherein the first shaping filter 420 receives a first shaping filter parameter and the second shaping filter 422 receives a second shaping filter parameter.

In order to generate an effective shaping filter parameter, the shaping filter parameter generation unit 419 is used to analyze the environmental noise d(n), thereby identifying the variation degree of the external audio noise. It can be observed from the circuit block diagram of FIG. 4 that what the error microphone 412 outputs is not the environmental noise d(n); instead, the error microphone 412 outputs the above-mentioned error signal e(n). The error signal e(n) is the synthesized result that the environmental noise d(n) and the anti-phase noise audio signal y(n) interfere each other. Therefore, in this embodiment, in order to let the shaping filter parameter generation unit 419 receive the environmental noise d(n) affected by the audio channel response schematic block 42, the anti-phase noise audio signal y(n) is subtracted from the error signal e(n) output by the error microphone 412, to reconstitute the environmental noise d(n).

Therefore, the automatic noise shaping circuit 413 includes the second transmission channel simulation unit 417. The second transmission channel simulation unit 417 is used to simulate the channel transfer function S(z) of the transmission channel 40 in the electrical domain, and accordingly convert the anti-phase noise signal y'(n) to a simulated anti-phase noise signal $\hat{y}(n)$ that is substantially equal to the anti-phase noise audio signal y(n). After subtracting the simulated anti-phase noise signal $\hat{y}(n)$ from the error signal e(n), the environmental noise d(n) is restored. The simulated anti-phase noise signal $\hat{y}(n)$ is similar to an electrical signal corresponding to the anti-phase noise audio signal y(n), the difference is that the anti-phase noise audio signal y(n) belongs to the acoustic domain and the simulated anti-phase noise signal $\hat{y}(n)$ belongs to the electrical domain. Therefore, in the embodiment, the transfer function of the second transmission channel simulation unit 417 is labeled as $\hat{S}(z)$ to distinguish between the acoustic channel transfer function S(z) and the electrical channel transfer function $\hat{S}(z)$.

To this end, the first adder circuit 418 receives the simulated anti-phase noise signal $\hat{y}(n)$ and the error signal e(n) to deduct the simulated anti-phase noise signal $\hat{y}(n)$ from the error signal e(n) to generate a restored environmental noise signal $\hat{d}(n)$. The restored environmental noise signal $\hat{d}(n)$ can be regarded as the same signal as the environmental noise d(n). Likewise, the environmental noise d(n) belongs to the acoustic domain, while restored environmental noise signal d(n) belongs to the electrical domain. The shaping filter parameter generation unit 419 receives the restored environmental noise signal $\hat{d}(n)$, and generates the first shaping filter parameter for the first shaping filter 420 and the second shaping filter parameter for the shaping filter 422 according to a stored preset noise shape and the restored environmental noise signal $\hat{d}(n)$.

In addition, the second adder circuit 421 receives the simulated anti-phase noise signal $\hat{y}(n)$ and the restored environmental noise signal $\hat{d}(n)$, and generates the restored error signal $\hat{e}(n)$. Similarly, the restored environmental noise signal $\hat{d}(n)$ is obtained by subtracting the simulated anti-phase noise signal $\hat{y}(n)$ from the error signal e(n). Therefore, in this embodiment, the restored environmental noise signal $\hat{d}(n)$ is added to the simulated anti-phase noise signal $\hat{y}(n)$ such that the original error signal e(n) can be approximately restored. In order to distinguish different signals, the restored error signal is represented by $\hat{e}(n)$. The second shaping filter 422 receives the restored error signal $\hat{e}(n)$, and shapes the restored error signal $\hat{e}(n)$ to obtain the shaped error signal $\hat{e}'(n)$, which is input to the coefficient adjustment unit 416.

On the other hand, the interference signal x(n) outputted by the external noise receiving microphone 411 will also be filtered by the first shaping filter 420. In this embodiment, the adaptive active noise cancellation apparatus 41 adopts a filtered-X least mean square (FxLMS) algorithm. In another embodiment, the adaptive active noise cancellation apparatus 41 may utilize another algorithm. According to the FxLMS algorithm, the shaped interference signal x'(n) output by the first shaping filter 420 is also required to process through the first transmission channel simulation unit 415. The first transmission channel simulation unit 415 is also used to simulate the channel transfer function S(z) of the transmission channel 40 in the electrical field, and converts the shaped interference signal x'(n) into the simulated shaped interference signal $\hat{x}'(n)$. It should be noted that according to the mathematical principle of the linear system, a position of the first transmission channel simulation unit 415 and a position of the first shaping filter 420 are interchangeable in circuit structures.

Thereby, the coefficient adjustment unit 416 can obtain the filter coefficient W(z) of the adaptive active noise filtering unit 414 according to the shaped error signal $\hat{e}'(n)$ and the simulated shaped interference signal $\hat{x}'(n)$, by utilizing the least mean square (LSM) operation, and continuously modify the output filter coefficient W(z) according to the shaped error signal $\hat{e}'(n)$ and the simulated shaped interference signal $\hat{x}'(n)$ to minimize the above-mentioned error signal e(n).

Figure 5:
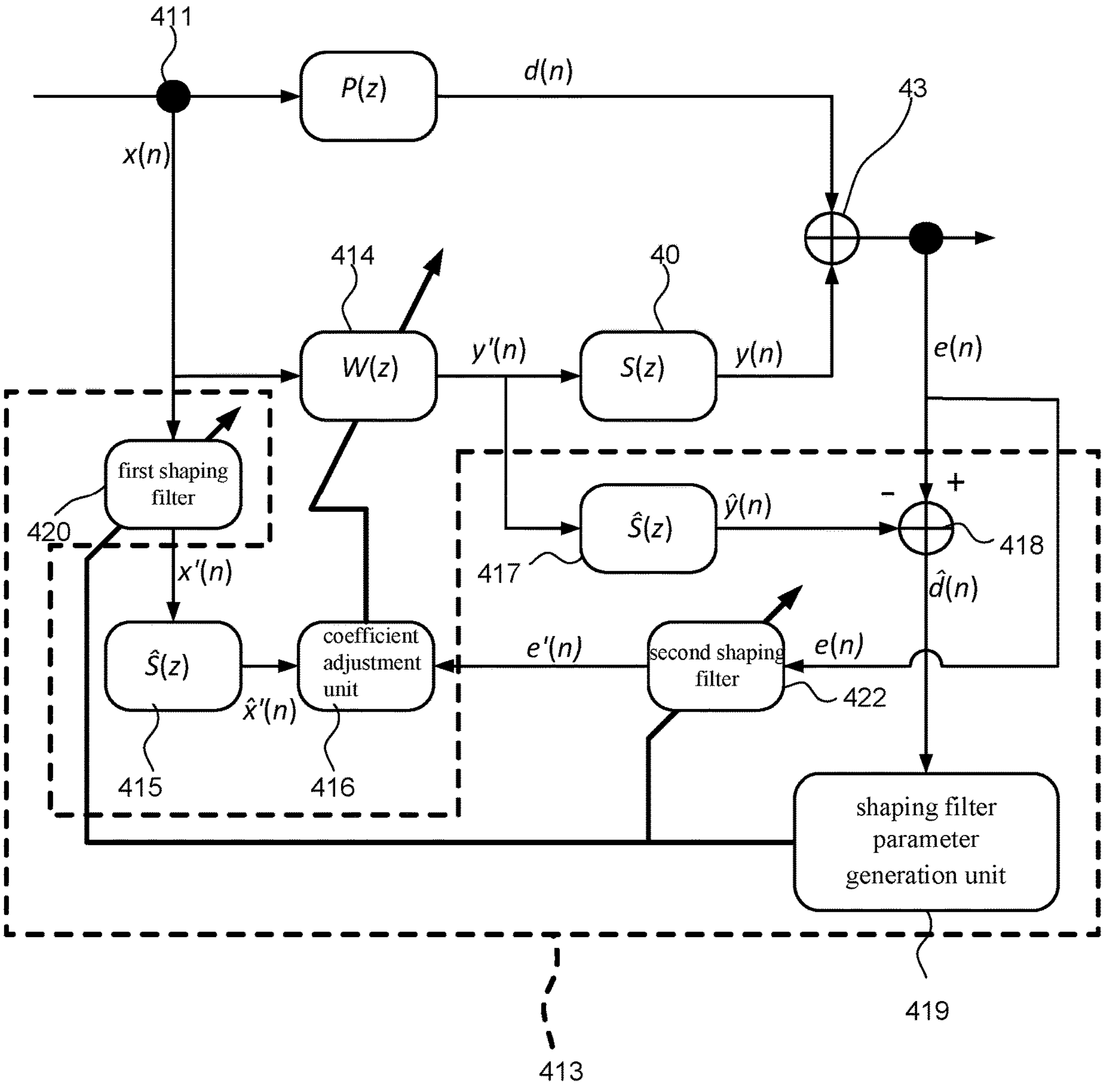
FIG. 5 illustrates a circuit block diagram depicting an audio playback system according to a preferred embodiment of the present invention.

FIG. 5 illustrates a circuit block diagram depicting an audio playback system according to a preferred embodiment of the present invention. Referring to FIG. 4 and FIG. 5, in the embodiment of FIG. 4, the second shaping filter 422 receives the restored error signal $\hat{e}(n)$, and in the embodiment of FIG. 5, the second shaping filter 422 receives the error signal e(n) directly. Based on the error signal e(n), the second shaping filter 422 outputs a shaped error signal which is represented in the mathematic form, as e'(n), for example. The shaping filter parameter generation unit 419 still receives the restored environmental noise signal $\hat{d}(n)$. People having ordinary skill in the art from the embodiment of FIG. 4 can understand that the two embodiments are equivalent in mathematic or circuit operation. Thus, the detail description is omitted. Compared with the embodiment of FIG. 4, this embodiment can reduce one adder 421. Therefore, the circuit is more simplified and cost thereof is relatively low.

Figure 6:
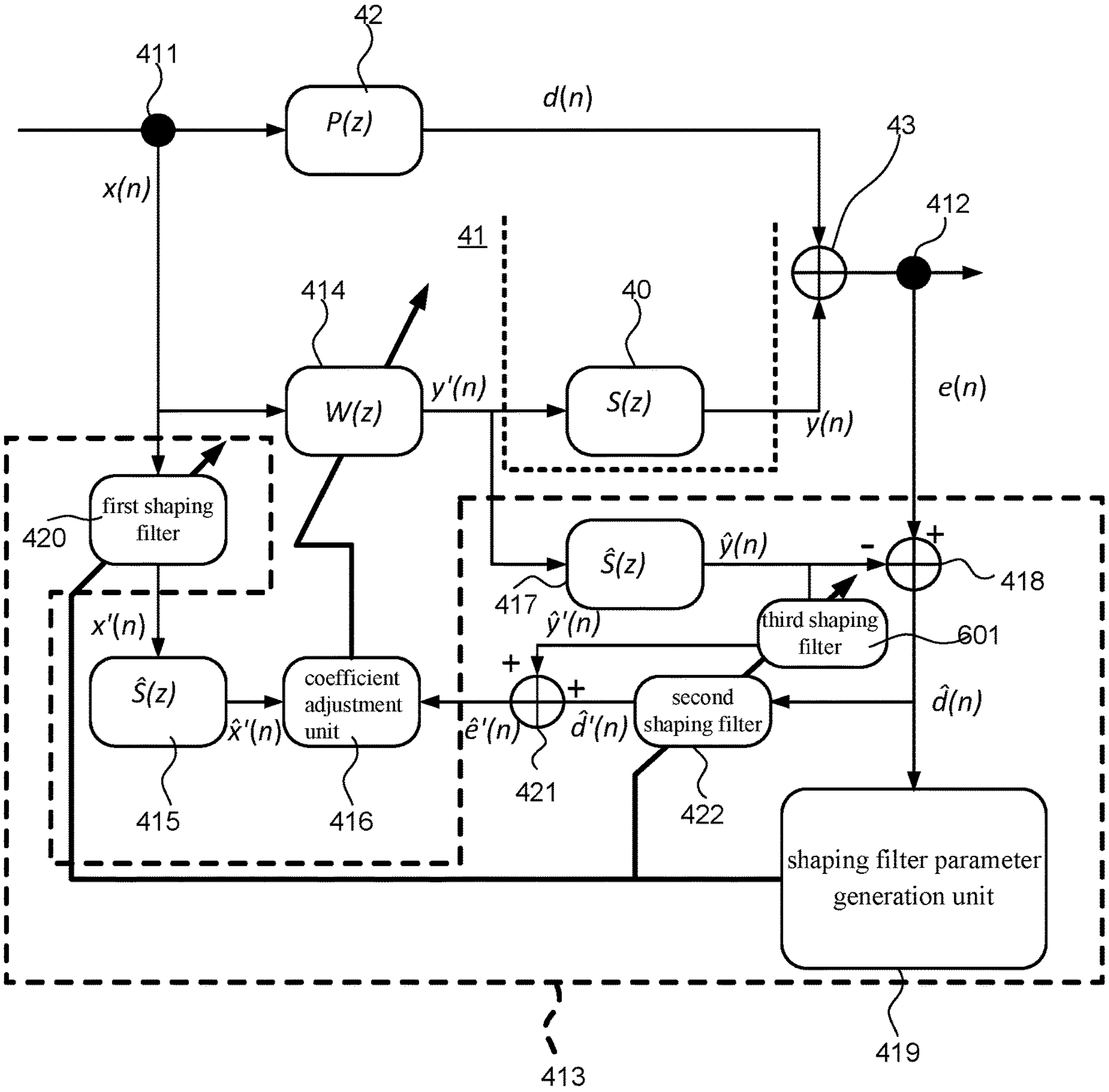
FIG. 6 illustrates a circuit block diagram depicting an audio playback system according to a preferred embodiment of the present invention.

FIG. 6 illustrates a circuit block diagram depicting an audio playback system according to a preferred embodiment of the present invention. Referring to FIG. 4 and FIG. 6, in the embodiment depicting in FIG. 6, the second shaping filter 422, which would otherwise receive the restored error signal $\hat{e}(n)$ in FIG. 4, is modified to directly receive the restored environmental noise signal $\hat{d}(n)$, and based on the restored environmental noise signal $\hat{d}(n)$ to generate a shaped restored environmental noise signal $\hat{d}'(n)$. In addition, the simulated anti-phase noise signal $\hat{y}(n)$ is also shaped into a shaped simulated anti-phase noise signal $\hat{y}'(n)$ through an additional third shaping filter 601, wherein the shaping filter parameter generation unit 419 also generates a third shaping filter parameter to the third shaping filter 601. Furthermore, the adder circuit 421 adds the shaped restored environmental noise signal $\hat{d}'(n)$ to the shaped simulated anti-phase noise signal $\hat{y}'(n)$ so as to obtain the shaped error signal $\hat{e}'(n)$. People having ordinary skill in the art, from the embodiment of FIG. 4 and its corresponding description, can understand that the two embodiments are equivalent in mathematics or circuit operations. Thus, the detail description is omitted.

Figure 7:
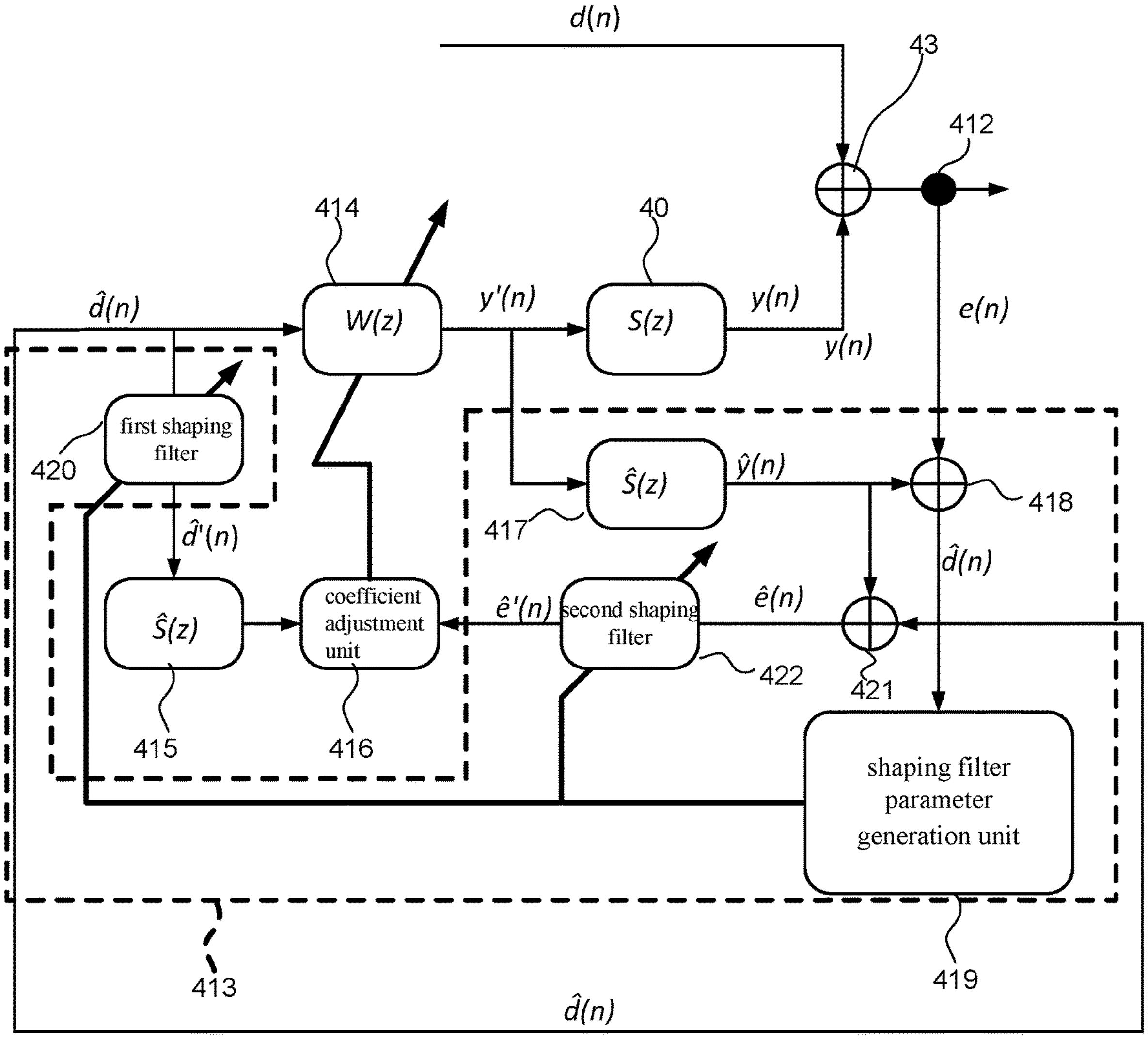
FIG. 7 illustrates a circuit block diagram depicting an audio playback system according to a preferred embodiment of the present invention.

FIG. 7 illustrates a circuit block diagram depicting an audio playback system according to a preferred embodiment of the present invention. Referring to FIG. 4 and FIG. 7, the difference between this embodiment of FIG. 7 and the embodiment of FIG. 4 is that the audio playback system of FIG. 7 is a feedback active noise cancellation headphone. The characteristic of the feedback active noise cancellation headphone is absent of the external noise receiving microphone 411, only the error microphone 412 in the ear canal. Therefore, compared with the embodiment of FIG. 4, the error signal e(n) generated by the error microphone 412 in this embodiment is required to be shaped by the automatic noise shaping circuit 413. In the embodiment depicting in FIG. 4, the interference signal x(n) generated by the external noise receiving microphone 411 and the error signal e(n) generated by the error microphone 412 are both required to be shaped by the automatic noise shaping circuit 413.

In the embodiment of the present invention, since the adaptive active noise cancellation apparatus 41 utilize the FxLMS algorithm for example, based on the algorithm structure of the FxLMS, the adaptive active noise cancellation apparatus 41 should take an external noise to serve as the input. In this embodiment, the external noise receiving microphone 411 is absent, the restored environmental noise signal $\hat{d}(n)$ output by the first adder circuit 418 can be served as the external noise. According to the description of the above-mentioned FIG. 4, the restored environmental noise signal $\hat{d}(n)$ is an electrical signal similar to that corresponding to the environmental noise $\hat{d}(n)$. In other words, in the present invention, the restored environmental noise signal $\hat{d}(n)$ is used to replace the interference signal x(n) of FIG. 4.

Compared with the first shaping filter 420 of the embodiment in FIG. 4, the input signal of the first shaping filter 420 in this embodiment is the restored environmental noise signal $\hat{d}(n)$ as an example. Similar to the structure in FIG. 4, the first shaping filter 420 shapes the restored environmental noise signal $\hat{d}(n)$, and outputs a shaped restored environmental noise signal $\hat{d}'(n)$ to the first transmission channel simulation unit 415. After the process by the first transmission channel simulation unit 415, the processed signal is output to the coefficient adjustment unit 416. Since the mathematics and circuit operations are similar to the embodiment of FIG. 4, people having ordinary skill in the art can understand the operation method of the present embodiment from the embodiment of FIG. 4 and the corresponding description thereof. Thus, the detail description is omitted.

Figure 8:
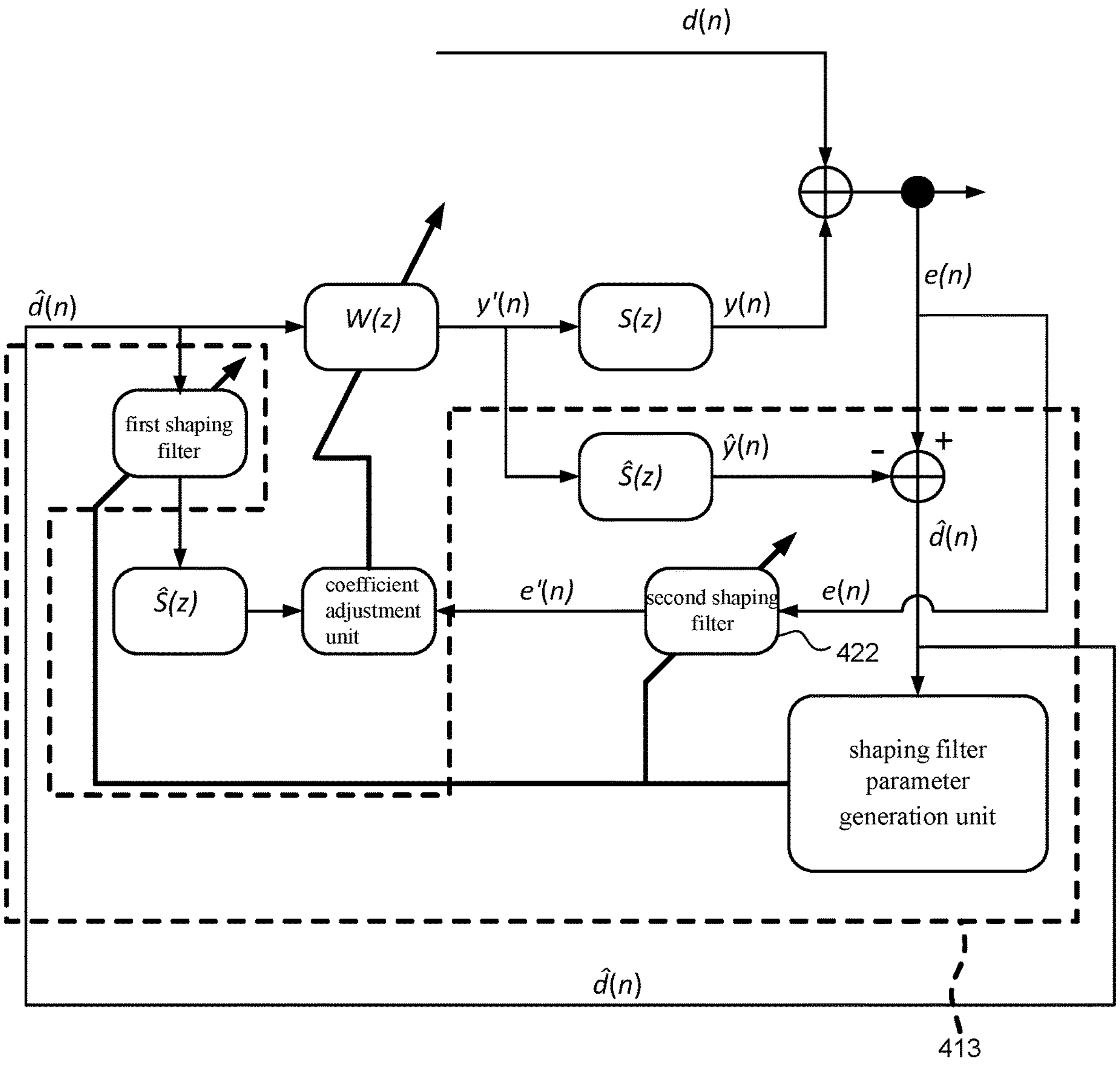
FIG. 8 illustrates a circuit block diagram depicting an audio playback system according to a preferred embodiment of the present invention.

FIG. 8 illustrates a circuit block diagram depicting an audio playback system according to a preferred embodiment of the present invention. Referring to FIG. 4, FIG. 5 and FIG. 8, in this embodiment, the audio playback system also adopts a feedback active noise cancellation headphone as an example. However, similar to FIG. 5, the second shaping filter 422 directly receives the error signal e(n) instead of the restored error signal $\hat{e}(n)$. Since the mathematics and the circuit operations are similar to the embodiments of FIG. 4 and FIG. 5, people having ordinary skill in the art can derive the operation method of the present embodiment from the embodiments in FIG. 4 and FIG. 5 and the corresponding description thereof. Thus, the detail description is omitted.

Figure 9:
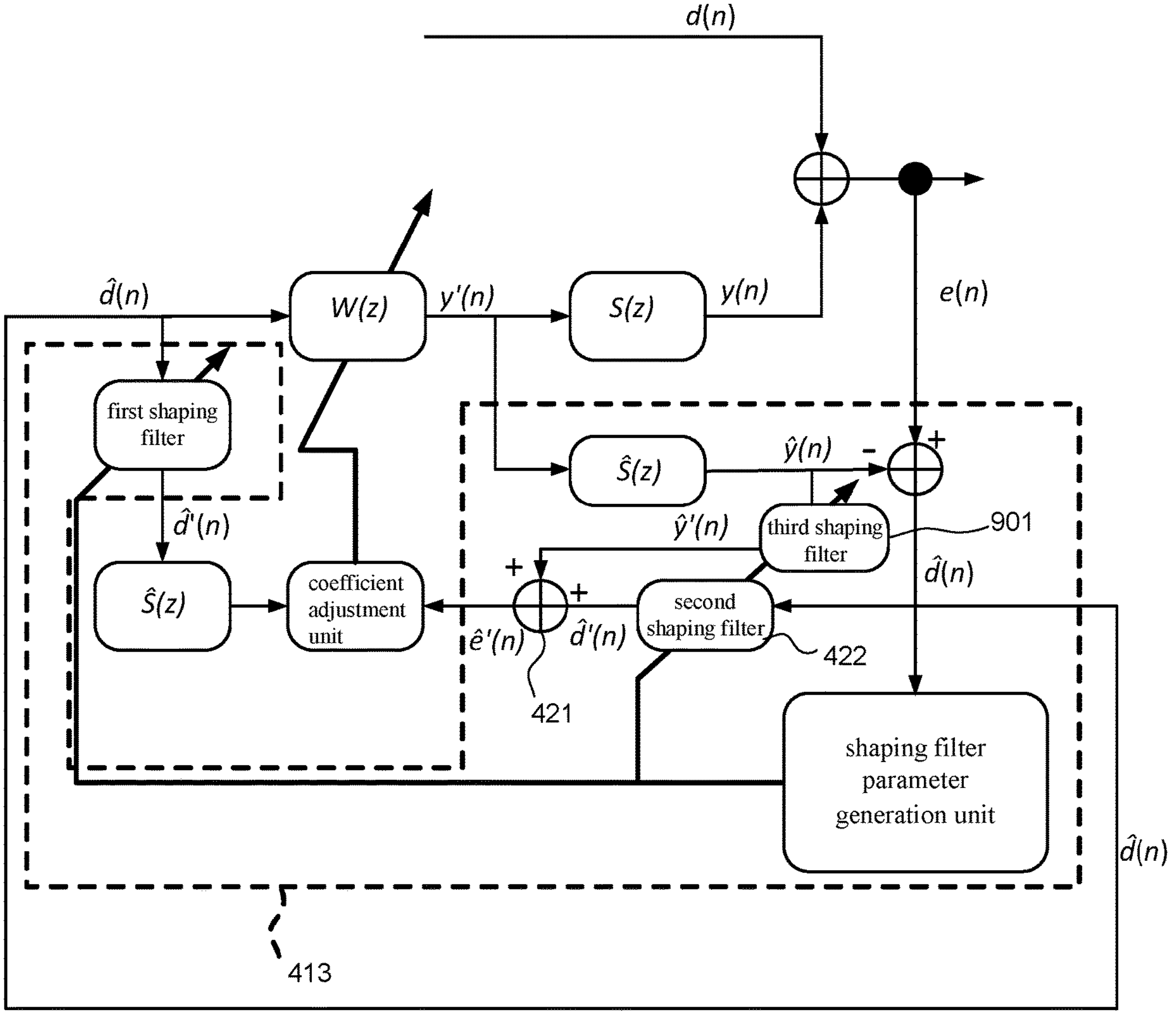
FIG. 9 illustrates a circuit block diagram depicting an audio playback system according to a preferred embodiment of the present invention.

FIG. 9 illustrates a circuit block diagram depicting an audio playback system according to a preferred embodiment of the present invention. Referring to FIG. 4, FIG. 7 and FIG. 9, in this embodiment, the audio playback system also adopts a feedback active noise cancellation headphone as an example. However, similar to FIG. 7, the second shaping filter 422 of FIG. 9, which in FIG. 7 would otherwise receive the restored error signal $\hat{e}(n)$, receives the restored environmental noise signal $\hat{d}(n)$ instead, and generates the shaped restored environmental noise signal $\hat{d}'(n)$ according to the restored environmental noise signal $\hat{d}(n)$. In addition, the simulated anti-phase noise signal $\hat{y}(n)$ is also shaped into a shaped simulated anti-phase noise signal $\hat{y}'(n)$ by the third shaping filter 901. Furthermore, the adder circuit 421 adds the shaped restored environmental noise signal $\hat{d}'(n)$ to the shaped simulated anti-phase noise signal $\hat{y}'(n)$ so as to obtain the shaped error signal $\hat{e}'(n)$. Since the mathematics and circuit operations are similar to the embodiments shown in FIG. 4 and FIG. 7, people having ordinary skill in the art can understand the operation method of the present embodiment from the embodiments in FIG. 4, FIG. 7 and the corresponding descriptions thereof. Thus, the detailed description is omitted.

Figure 10:
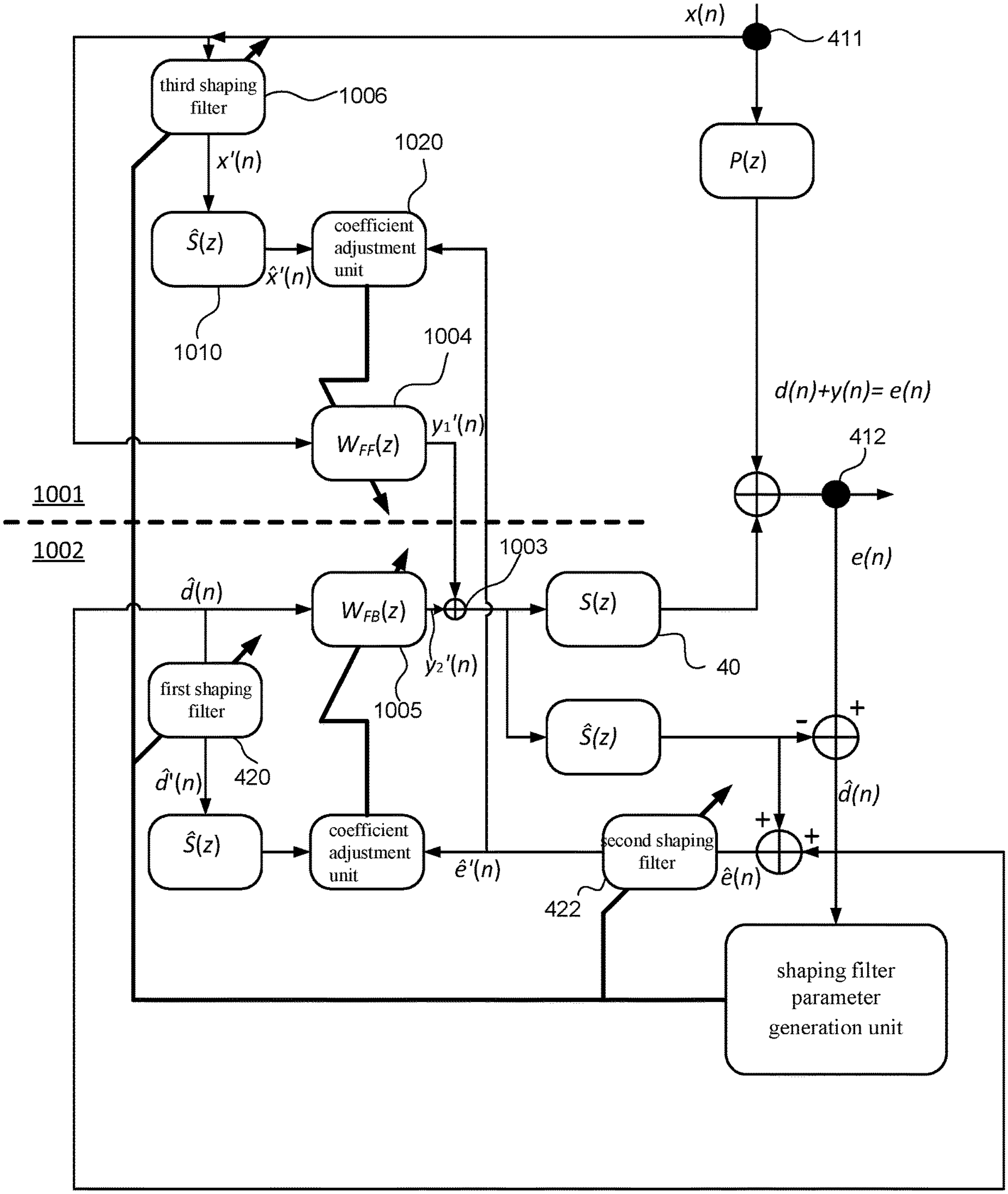
FIG. 10 illustrates a circuit block diagram depicting an audio playback system according to a preferred embodiment of the present invention.

FIG. 10 illustrates a circuit block diagram depicting an audio playback system according to a preferred embodiment of the present invention. Referring to FIG. 4, FIG. 7 and FIG. 10, in this embodiment, the audio playback system is a hybrid active noise cancellation headphone for example. In other words, an adaptive active noise cancellation apparatus includes a feedforward noise cancellation circuit 1001 and a feedback noise cancellation circuit 1002, wherein they are illustratively separated by dashed lines in drawings. Compared with the first shaping filter 420 of the embodiment in FIG. 4, the input signal of the first shaping filter 420 in this embodiment is the restored environmental noise signal $\hat{d}(n)$, wherein the first shaping filter 420 is used to shape the restored environmental noise signal $\hat{d}(n)$ into a shaped restored environmental noise signal $\hat{d}'(n)$. The operation of the feedforward noise cancellation circuit 1001 is similar to FIG. 4 and the description thereof, further, the operation of the feedback noise canceling circuit 1002 is similar to that of FIG. 7 and the description thereof.

The feedforward noise cancellation circuit 1001 at least includes a feedforward adaptive active noise filtering unit 1004 (the filter coefficient in the figure is represented as $W_{FF}$), a third shaping filter 1006, a third transmission channel simulation unit 1010, and a second coefficient adjustment unit 1020. In the operation of the feedforward noise cancellation circuit 1001, the signal processing for the interference signal x(n) is the same as that depicting in FIG. 4. The third shaping filter 1006 is used to shape the interference signal x(n) into the shaped interference signal x'(n), and provide the shaped interference signal x'(n) to the transmission channel simulation unit 1010. The transmission channel simulation unit 1010 then converts the shaped interference signal x'(n) into a simulated shaped interference signal $\hat{x}'(n)$ based on the channel transfer function S(z) of the simulated transmission channel 40, and provides the simulated shaped interference signal $\hat{x}'(n)$ to the coefficient adjustment unit 1020. On the other hand, the shaped error signal $\hat{e}'(n)$ received by the coefficient adjustment unit 1020 is provided by the second shaping filter 422 in the feedback noise cancellation circuit 1002. In this embodiment, the signal processing method of converting the error signal e(n) to the shaped error signal $\hat{e}'(n)$ is the same as that depicted in FIG. 4. Thus, the detail description is omitted.

In addition, in FIG. 10, an adder circuit 1003 is further included. The adder circuit 1003 functions to add the anti-phase noise signal $y_1'(n)$ output by the feedforward adaptive active noise filtering unit 1004 to the anti-phase noise signal y2'(n) output by the feedback adaptive active noise filtering unit 1005 to obtain an output signal. The output signal is output from the adder circuit 1003 to transmission channel 40.

In this embodiment, since the feedforward noise cancellation circuit 1001 and the feedback noise cancellation circuit 1002 are both adaptive noise cancellation circuits, in this embodiment, the interference signal x(n) and the error signal e(n) still need to be shaped through shaping filters (such as the shaping filters 420, 422 and 1006). Then, in the feedforward noise cancellation circuit 1001 and the feedback noise cancellation circuit 1002, adaptive algorithm operations are performed to obtain the filter parameter $W_{FF}(Z)$ of the feedforward active noise filtering unit 1004 and the filter parameter $W_{FB}(Z)$ of the feedback adaptive active noise filtering unit 1005. In the embodiment of the present invention, filter coefficients are, for example, calculated by the iterative operation of the Least Mean Square Method (LMS). However, the present invention is not limited thereto.

Figure 11:
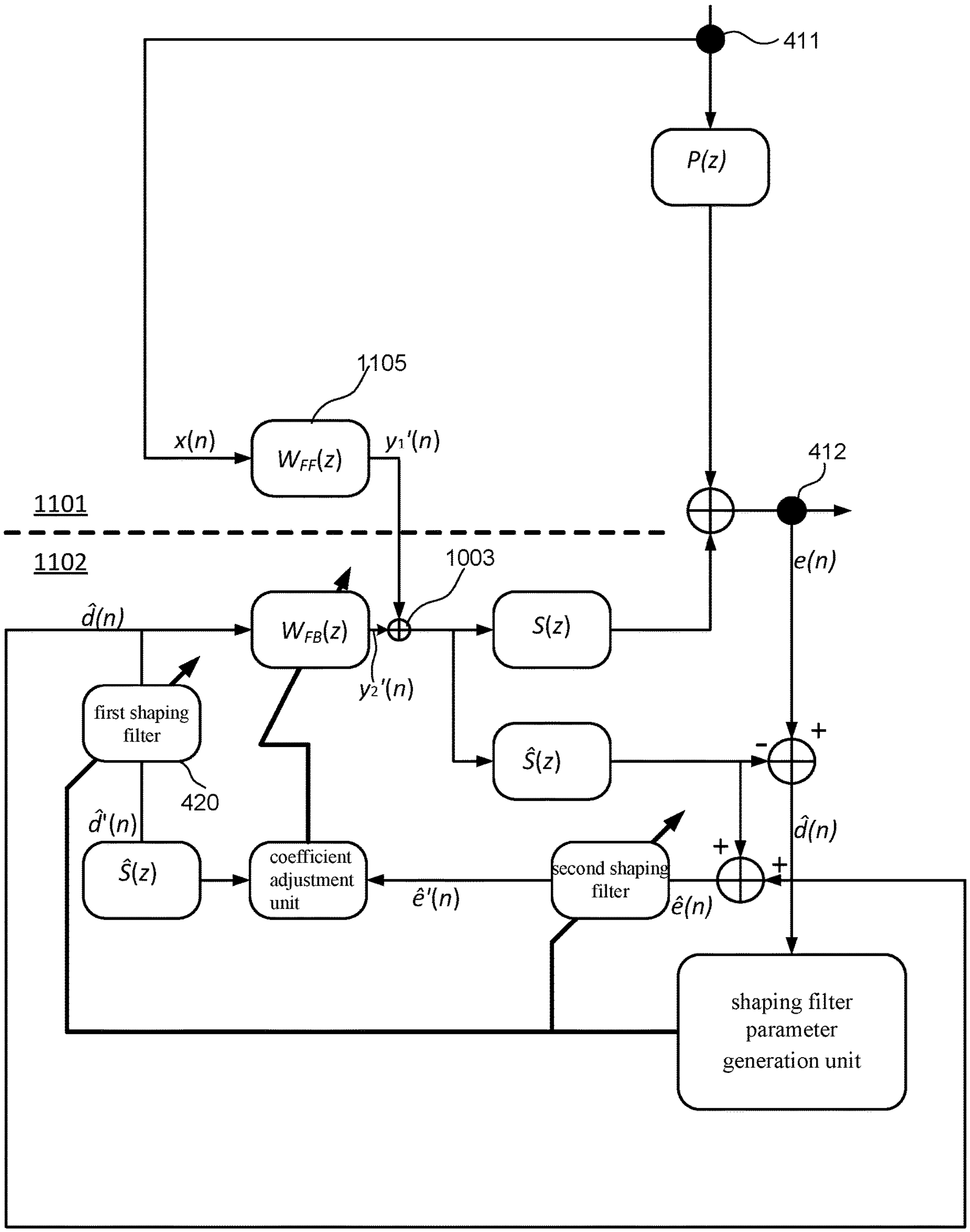
FIG. 11 illustrates a circuit block diagram depicting an audio playback system according to a preferred embodiment of the present invention.

FIG. 11 illustrates a circuit block diagram depicting an audio playback system according to a preferred embodiment of the present invention. Referring to FIG. 7, FIG. 10 and FIG. 11, in this embodiment, the audio playback system also adopts a hybrid active noise cancellation headphone as an example.

However, in the hybrid active noise cancellation headphone, only the feedback noise cancellation circuit 1102 adopts the active noise cancellation, and the feedforward noise cancellation circuit 1101 adopts static noise cancellation. Since static noise cancellation is adopted, the coefficient adjustment unit 1020 and its related functional blocks, such as the third transmission channel simulation unit 1010, have been removed in this embodiment compared with the feedforward active noise cancellation circuit 1001 of FIG. 10. The feedforward noise cancellation circuit 1101 includes a static noise filtering unit 1105. The operation of the feedback noise cancellation circuit 1102 can be referred to the embodiments in FIG. 4 and FIG. 7. Therefore, the detail description is omitted.

Figure 12:
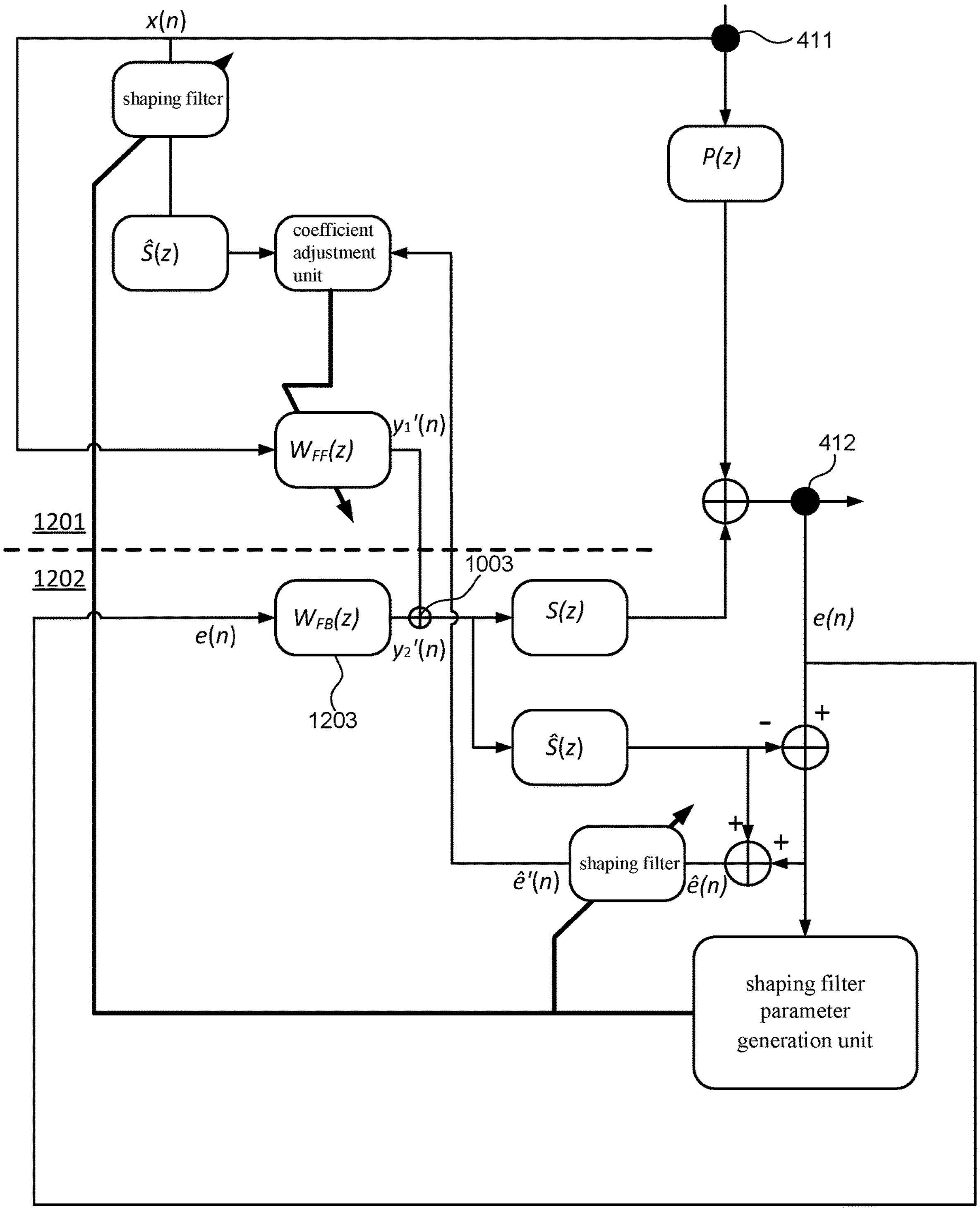
FIG. 12 illustrates a circuit block diagram depicting an audio playback system according to a preferred embodiment of the present invention.

FIG. 12 illustrates a circuit block diagram depicting an audio playback system according to a preferred embodiment of the present invention. Referring to FIG. 4, FIG. 10 and FIG. 12, in this embodiment, the audio playback system also takes a hybrid active noise cancellation headphone as an example.

However, the hybrid active noise cancellation headphone only has the feedforward noise cancellation circuit 1201 adopting adaptive noise cancellation. The feedback noise cancellation circuit 1202 adopts static active noise cancellation. The operation of the feedforward noise elimination circuit 1202 can refer to the embodiment in FIG. 4. Therefore, the detail description is omitted. More particularly, the interference signal received by the feedback noise filtering unit 1203 of the feedback noise cancellation circuit 1202 is the error signal e(n) instead of the restored environmental noise signal d(n).

Figure 13:
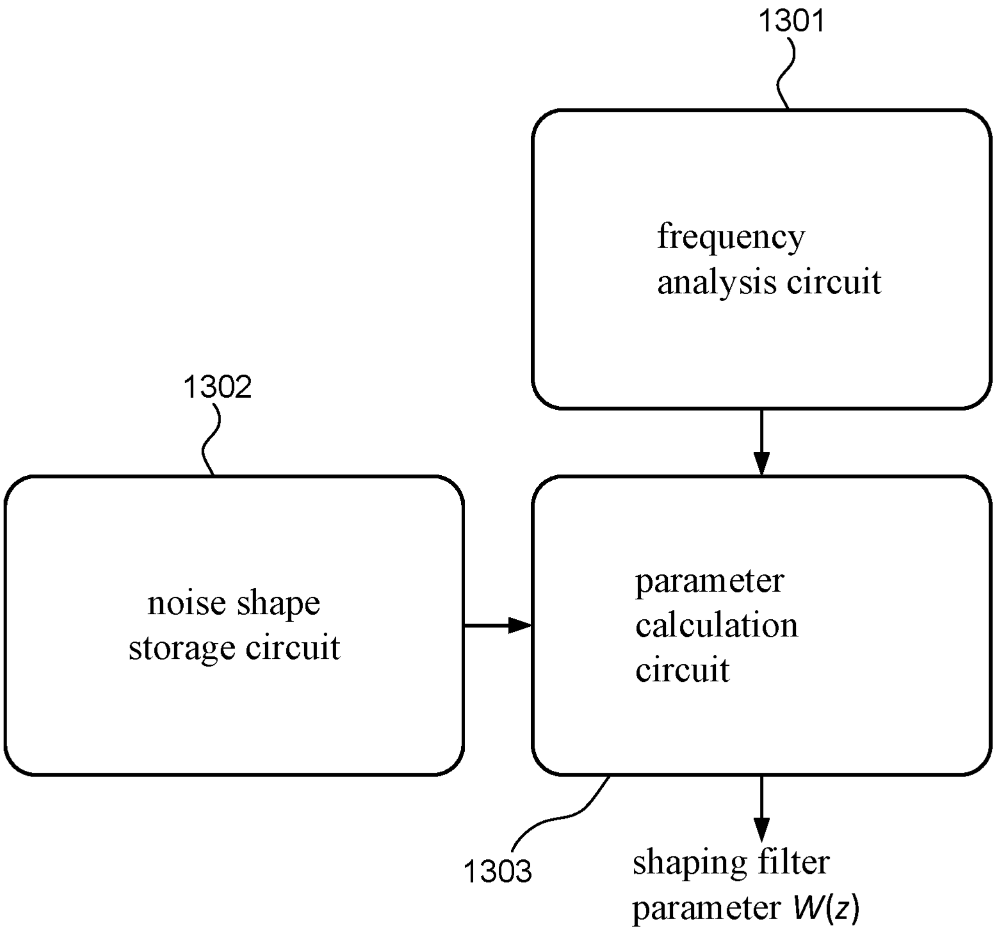
FIG. 13 illustrates a circuit block diagram depicting a shaping filter parameter generation unit of an audio playback system according to a preferred embodiment of the present invention.

FIG. 13 illustrates a circuit block diagram depicting a shaping filter parameter generation unit of an audio playback system according to a preferred embodiment of the present invention. Referring to FIG. 13, in this embodiment, a shaping filter parameter generation unit 419 includes a frequency analysis circuit 1301, a noise shape storage circuit 1302 and a parameter calculation circuit 1303. The frequency analysis circuit 1301 in this embodiment is implemented by, for example, a FFT (fast Fourier transform) operation circuit, whereby the received restored environmental noise signal $\hat{d}(n)$ is converted from time domain to frequency domain. The parameter calculation circuit 1303 obtains frequency domain parameters of an ideal noise internally stored in the noise shape storage circuit 1302. Subsequently, the parameter calculation circuit 1303 divides the frequency domain parameters of the ideal noise by the frequency domain parameters of the restored environmental noise signal $\hat{d}(n)$ to obtain the shaping filter parameter W(z).

Although fast Fourier transform and division operation are taken an example in the above embodiment, people having ordinary skill in the art should know that to multiply two signals in the frequency domain is equivalent to convolution two discrete signals in time domain. Thus, the above-mentioned operations of the above embodiment can be implemented by different mathematical operations to obtain the shaping filter parameter W(z) in other embodiments. Therefore, the present invention is not limited thereto.

It is noted that, in the above-mentioned embodiments, the number of shaping filters is at least two, and in order to have the same shaping filtering effect on all noise or interference signals, the shaping filter parameter generation unit outputs the same filter parameters to each shaping filter for example. However, people having ordinary skill in the art should be able to infer that, in practical circuit design applications, in order to match the circuit design, the filter parameters output by the shaping filter parameter generation unit to each shaping filter may also be different. Moreover, in the actual circuit design application, the number of shaping filters of the adaptive active noise cancellation apparatus may also be only one, so the present invention does not limit the number of shaping filters and the design of filtering parameters of the shaping filters.

In summary, the spirit of the present invention is to shape the received error signal and the received interference signal according to an ideal noise shape. Afterward, the shaped interference signal and the shaped error signal is transmitted to the coefficient adjustment unit to perform adaptive algorithm, such that the adaptive active noise filtering unit is not only can affectively suppress the external noise and the noise in the ear canal to minimize the error signal, but also can suppress specific frequencies to which the human ear is sensitive.

Although the embodiment has been described as having specific elements in FIGS. 4 to 13, it should be noted that additional elements may be included to achieve better performance without departing from the spirit of the invention. Each element of FIGS. 4 to 13 is composed of various circuits and arranged operably to perform the aforementioned operations. People having ordinary skill in the art should be apparent that these processes can include more or fewer operations, which can be executed serially or in parallel (e.g., using parallel processors or a multi-threading environment). Therefore, the present invention is not limited thereto.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adaptive active noise cancellation apparatus, adapted for an audio playback system, wherein the audio playback system is for outputting an anti-phase noise audio signal according to an anti-phase noise signal, wherein the audio playback system comprises an error microphone for receiving an environmental noise and the anti-phase noise audio signal to generate an error signal, wherein the adaptive active noise cancellation apparatus comprises:

an automatic noise shaping circuit receiving the error signal, shaping an interference signal to a shaped interference signal and shaping the error signal to a shaped error signal according to a preset noise shape, and outputting the shaped interference signal and the shaped error signal;

an adaptive active noise filtering unit receiving the interference signal, outputting the anti-phase noise signal for generating the anti-phase noise audio signal;

a first transmission channel simulation unit receiving the shaped interference signal for generating a simulated shaped interference signal according to a channel transfer function; and a coefficient adjustment unit receiving the simulated shaped interference signal and the shaped error signal, and adjusting a filter coefficient of the adaptive active noise filtering unit by an adaptive algorithm according to the simulated shaped interference signal and the shaped error signal.

2. The adaptive active noise cancellation apparatus according to claim 1, wherein the automatic noise shaping circuit comprises:

a second transmission channel simulation unit receiving the anti-phase noise signal for generating a simulation anti-phase noise signal according to the channel transfer function;

a first adder circuit receiving the simulation anti-phase noise signal and the error signal for generating a restored environmental noise signal;

a shaping filter parameter generation unit receiving the restored environmental noise signal, and generating a first shaping filter parameter and a second shaping filter parameter according to the preset noise shape and the restored environmental noise signal;

a first shaping filter receiving the first shaping filter parameter and the interference signal for generating the shaped interference signal;

a second adder circuit receiving the simulated anti-phase noise signal and the restored environmental noise signal for generating a restored error signal; and a second shaping filter receiving the second shaping filter parameter and the restored error signal for generating the shaped error signal.

3. The adaptive active noise cancellation apparatus according to claim 2, wherein when the audio playback system is a feedback active noise cancellation headphone, the interference signal is the restored environmental noise signal.

4. The adaptive active noise cancellation apparatus according to claim 2, wherein when the audio playback system is a feedforward active noise cancellation headphone, the audio playback system further comprises:

an external noise receiving microphone receiving an external audio noise, and converting the external audio noise to the interference signal.

5. The adaptive active noise cancellation apparatus according to claim 1, wherein the automatic noise shaping circuit comprises:

a second transmission channel simulation unit receiving the anti-phase noise signal for generating a simulated anti-phase noise signal according to the channel transfer function;

a first adder circuit receiving the simulated anti-phase noise signal and the error signal for generating a restored environmental noise signal;

a shaping filter parameter generation unit receiving the restored environmental noise signal, and generating a first shaping filter parameter and a second shaping filter parameter according to the preset noise shape and the restored environmental noise signal;

a first shaping filter receiving the first shaping filter parameter and the interference signal for generating the shaped interference signal; and a second shaping filter receiving the second shaping filter parameter and the error signal for generating the shaped error signal.

6. The adaptive active noise cancellation apparatus according to claim 5, wherein when the audio playback system is a feedback active noise cancellation headphone, the interference signal is the restored environmental noise signal.

7. The adaptive active noise cancellation apparatus according to claim 5, wherein when the audio playback system is a feedforward active noise cancellation headphone, the audio playback system comprises:

an external noise receiving microphone receiving an external audio noise, and converting the external audio noise to the interference signal.

8. The adaptive active noise cancellation apparatus of claim 1, wherein the automatic noise shaping circuit comprises:

a second transmission channel simulation unit receiving the anti-phase noise signal for generating a simulated anti-phase noise signal according to the channel transfer function;

a first adder circuit receiving the simulated anti-phase noise signal and the error signal for generating a restored environmental noise signal;

a shaping filter parameter generation unit receiving the restored environmental noise signal, and generating a first shaping filter parameter, a second shaping filter parameter and a third shaping filter parameter according to the preset noise shape and the restored environmental noise signal;

a first shaping filter receiving the first shaping filter parameter and the interference signal for generating the shaped interference signal;

a second shaping filter receiving the second shaping filter parameter and the restored environmental noise signal for generating a shaped restored environmental noise signal;

a third shaping filter receiving the third shaping filter parameter and the simulated anti-phase noise signal for generating a shaped simulated anti-phase noise signal; and a second adder circuit receiving the shaped simulated anti-phase noise signal and the shaped restored environmental noise signal for generating the shaped error signal.

9. The adaptive active noise cancellation apparatus of claim 8, wherein when the audio playback system is a feedback active noise cancellation headphone, the interference signal is the restored environmental noise signal.

10. The adaptive active noise cancellation apparatus according to claim 8, wherein when the audio playback system is a feedforward active noise cancellation headphone, the audio playback system further comprises:

an external noise receiving microphone receiving an external audio noise, and converting the external audio noise to the interference signal.

11. The adaptive active noise cancellation apparatus according to claim 1, wherein the audio playback system is a hybrid active noise cancellation headphone, wherein the interference signal is a restored environmental noise signal, and the audio playback system comprises:

an external noise receiving microphone receiving an external audio noise, and converting the external audio noise to a second interference signal, wherein the adaptive active noise cancellation apparatus further comprises:

an active noise filtering unit receiving a second interference signal, outputting a second anti-phase noise signal for generating the anti-phase noise audio signal; and a third adder circuit receiving the anti-phase noise signal and the second anti-phase noise signal, and adding the anti-phase noise signal to the second anti-phase noise signal, wherein the audio playback system outputs an anti-phase noise audio signal according to the anti-phase noise signal and the second anti-phase noise signal.

12. The adaptive active noise cancellation apparatus according to claim 11, wherein the active noise filtering unit is a feedforward adaptive active noise filtering unit, the automatic noise shaping circuit is further adapted for shaping the second interference signal to a second shaping interference signal according to the preset noise shape, wherein the adaptive active noise cancellation apparatus further comprises:

a third transmission channel simulation unit receiving the second shaped interference signal for generating a second simulated shaped interference signal according to the channel transfer function; and a second coefficient adjustment unit receiving the second simulated shaped interference signal and the shaped error signal, and dynamically adjusting a filter parameter of the feedforward adaptive active noise filtering unit according to the second simulated shaped interference signal and the shaped error signal to minimize the error signal.

13. The adaptive active noise cancellation apparatus according to claim 1, wherein the audio playback system is a hybrid active noise cancellation headphone, and the audio playback system further comprises:

an external noise receiving microphone receiving an external audio noise, and converting the external audio noise to the interference signal;

wherein the adaptive active noise cancellation apparatus further comprises:

a feedback noise filtering unit receiving the error signal, and outputting a second anti-phase noise signal for generating the anti-phase noise audio signal; and a third adder circuit receiving the anti-phase noise signal and the second anti-phase noise signal, and adding the anti-phase noise signal to the second anti-phase noise signal, wherein the audio playback system outputs an anti-phase noise audio signal according to the anti-phase noise signal and the second anti-phase noise signal.

14. The adaptive active noise cancellation apparatus according to claim 1, wherein the automatic noise shaping circuit at least comprises a shaping filter parameter generation unit, and the shaping filter parameter generation unit comprises:

a frequency analysis circuit receiving a restored environmental noise signal, and applying a frequency analysis algorithm to the restored environmental noise signal to obtain a frequency energy distribution corresponding to the restored environmental noise signal;

a noise shape storage circuit storing a frequency energy distribution corresponding to an ideal noise; and a parameter calculation circuit calculating a ratio of a frequency energy distribution corresponding to the ideal noise to a frequency energy distribution corresponding to the restored environmental noise signal so as to obtain a shaping filter parameter.

15. An audio playback system, outputting an anti-phase noise audio signal according to an anti-phase noise signal, wherein the audio playback system comprises:

an error microphone receiving an environmental noise and the anti-phase noise audio signal, to generate an error signal; and an adaptive active noise cancellation apparatus, comprising:

an automatic noise shaping circuit receiving the error signal, shaping an interference signal to a shaped interference signal and the error signal to a shaped error signal according to a preset noise shape and outputting the shaped interference signal and the shaped error signal;

an adaptive active noise filtering unit receiving the interference signal, outputting the anti-phase noise signal for generating the anti-phase noise audio signal;

a first transmission channel simulation unit receiving the shaped interference signal for generating a simulated shaped interference signal according to a channel transfer function; and a coefficient adjustment unit receiving the simulated shaped interference signal and the shaped error signal, adjusting a filter coefficient of the adaptive active noise filtering unit by an adaptive algorithm according to the simulated shaped interference signal and the shaped error signal.

16. The audio playback system according to claim 15, wherein the automatic noise shaping circuit comprises:

a second transmission channel simulation unit receiving the anti-phase noise signal for generating a simulated anti-phase noise signal according to the channel transfer function;

a first adder circuit, receiving the simulated anti-phase noise signal and the error signal for generating a restored environmental noise signal;

a shaping filter parameter generation unit receiving the restored environmental noise signal, and generating a first shaping filter parameter and a second shaping filter parameter according to the preset noise shape and the restored environmental noise signal;

a first shaping filter receiving the first shaping filter parameter and the interference signal for generating the shaped interference signal;

a second adder circuit receiving the simulated anti-phase noise signal and the restored environmental noise signal for generating a restored error signal; and a second shaping filter, receiving the second shaping filter parameter and the restored error signal for generating the shaped error signal.

17. The audio playback system according to claim 16, wherein when the audio playback system is a feedback active noise cancellation headphone, the interference signal is the restored environmental noise signal.

18. The audio playback system according to claim 16, wherein when the audio playback system is a feedforward active noise cancellation headphone, the audio playback system further comprises:

an external noise receiving microphone receiving an external audio noise, and converting the external audio noise to the interference signal.

19. The audio playback system according to claim 15, wherein the automatic noise shaping circuit comprises:

a second transmission channel simulation unit receiving the anti-phase noise signal for generating a simulated anti-phase noise signal according to the channel transfer function;

a first adder circuit receiving the simulated anti-phase noise signal and the error signal for generating a restored environmental noise signal;

a shaping filter parameter generation unit receiving the restored environmental noise signal, and generating a first shaping filter parameter and a second shaping filter parameter according to the preset noise shape and the restored environmental noise signal;

a first shaping filter receiving the first shaping filter parameter and the interference signal for generating the shaped interference signal; and a second shaping filter receiving the second shaping filter parameter and the error signal, for generating the shaped error signal.

20. The audio playback system according to claim 19, wherein when the audio playback system is a feedback active noise cancellation headphone, the interference signal is the restored environmental noise signal.

21. The audio playback system according to claim 19, wherein when the audio playback system is a feedforward active noise cancellation headphone, the audio playback system comprises:

an external noise receiving microphone receiving an external audio noise, and converting the external audio noise to the interference signal.

22. The audio playback system according to claim 15, wherein the automatic noise shaping circuit comprises:

a second transmission channel simulation unit receiving the anti-phase noise signal for generating a simulated anti-phase noise signal according to the channel transfer function;

a first adder circuit receiving the simulated anti-phase noise signal and the error signal for generating a restored environmental noise signal;

a shaping filter parameter generation unit receiving the restored environmental noise signal, and generating a first shaping filter parameter, a second shaping filter parameter and a third shaping filter parameter according to the preset noise shape and the restored environmental noise signal;

a first shaping filter receiving the first shaping filter parameter and the interference signal for generating the shaped interference signal;

a second shaping filter receiving the second shaping filter parameter and the restored environmental noise signal for generating a shaped restored environmental noise signal;

a third shaping filter receiving the third shaping filter parameter and the simulated anti-phase noise signal for generating a shaped simulated anti-phase noise signal; and a second adder circuit receiving the shaped simulated anti-phase noise signal and the shaped restored environmental noise signal for generating the shaped error signal.

23. The audio playback system according to claim 22, wherein when the audio playback system is a feedback active noise cancellation headphone, the interference signal is the restored environmental noise signal.

24. The audio playback system according to claim 22, wherein when the audio playback system is a feedforward active noise cancellation headphone, the audio playback system further comprises:

an external noise receiving microphone receiving an external audio noise, and converting the external audio noise to the interference signal.

25. The audio playback system according to claim 15, wherein the audio playback system is a hybrid active noise cancellation headphone, wherein the interference signal is a restored environmental noise signal, and the audio playback system comprises:

an external noise receiving microphone receiving an external audio noise, and converting the external audio noise to a second interference signal, wherein the adaptive active noise cancellation apparatus further comprises:

an active noise filtering unit receiving a second interference signal, outputting a second anti-phase noise signal for generating the anti-phase noise audio signal; and a third adder circuit receiving the anti-phase noise signal and the second anti-phase noise signal, and adding the anti-phase noise signal to the second anti-phase noise signal, wherein the audio playback system outputs an anti-phase noise audio signal according to the anti-phase noise signal and the second anti-phase noise signal.

26. The audio playback system according to claim 25, wherein the active noise filtering unit is a feedforward adaptive active noise filtering unit, the automatic noise shaping circuit is further adapted for shaping the second interference signal to a second shaped interference signal according to the preset noise shape, wherein the adaptive active noise cancellation apparatus further comprises:

a third transmission channel simulation unit receiving the second shaped interference signal for generating a second simulated shaped interference signal according to the channel transfer function; and a second coefficient adjustment unit receiving the second simulated shaped interference signal and the shaped error signal, dynamically adjusting a filter parameter of the feedforward adaptive active noise filtering unit according to the second simulated shaped interference signal and the shaped error signal to minimize the error signal.

27. The audio playback system according to claim 15, wherein the audio playback system is a hybrid active noise cancellation headphone, and the audio playback system further comprises:

an external noise receiving microphone receiving an external audio noise, and converting the external audio noise to the interference signal;

wherein the adaptive active noise cancellation apparatus further comprises:

a feedback noise filtering unit receiving the error signal, and outputting a second anti-phase noise signal for generating the anti-phase noise audio signal; and a third adder circuit receiving the anti-phase noise signal and the second anti-phase noise signal, and adding the anti-phase noise signal to the second anti-phase noise signal, wherein the audio playback system outputs an anti-phase noise audio signal according to the anti-phase noise signal and the second anti-phase noise signal.

28. The audio playback system according to claim 15, wherein the automatic noise shaping circuit at least comprises a shaping filter parameter generation unit, and the shaping filter parameter generation unit comprises:

a frequency analysis circuit receiving a restored environmental noise signal, and applying a frequency analysis algorithm to the restored environmental noise signal, to obtain a frequency energy distribution corresponding to the restored environmental noise signal;

a noise shape storage circuit storing a frequency energy distribution corresponding to an ideal noise; and a parameter calculation circuit, calculating a ratio of a frequency energy distribution corresponding to the ideal noise to a frequency energy distribution corresponding to the restored environmental noise signal so as to obtain a shaping filter parameter.

* * * * *